United States Patent [19]
Tong et al.

[11] Patent Number: 5,995,565
[45] Date of Patent: Nov. 30, 1999

[54] CO-CHANNEL INTERFERENCE REDUCTION

[76] Inventors: Wen Tong, 70 McEwen Ave., Apt. 1106, Ottawa, Canada, K2B 5W3; Rui Wang, 900 Dynes Rd., Apt. 1204, Ottawa, Canada, K2C 3L6; Alauddin Javed, 6 Marsilea Place, Nepean, Ontario, Canada, K2H 7V2; Alexander Vasiliyevich Garmonov, Lubov Shevtsova St., 5/1, Flat 6, Voronezh, Russian Federation, 394096; Anatoli Vasilievich Kotov, 475 Elgin St., Apt. 506, Ottawa, Ontario, Canada, K2B 2E6; Andrey Yuriyevich Savinkov, Bulevard Pobedy, 23"A", Flat 17, Voronezh, Russian Federation, 394053; Anatoly Gennadiyvich Filatov, Domostroiteley St., 77, Flat 95, Voronezh, Russian Federation, 394038

[21] Appl. No.: 08/728,368

[22] Filed: Oct. 10, 1996

Related U.S. Application Data

[60] Provisional application No. 60/004,979, Oct. 10, 1995.

[51] Int. Cl.⁶ .............. H04B 1/10; H04L 25/08
[52] U.S. Cl. ............ 375/346; 455/296; 375/350; 364/574
[58] Field of Search ............... 375/346, 350; 348/607; 455/296; 364/574

[56] References Cited

U.S. PATENT DOCUMENTS

| | | | |
|---|---|---|---|
| 4,506,228 | 3/1985 | Kammeyer | 329/107 |
| 4,785,348 | 11/1988 | Fonsalas et al. | 358/133 |
| 5,084,899 | 1/1992 | Harrington | 375/1 |
| 5,289,194 | 2/1994 | Schlosser | 342/378 |
| 5,299,233 | 3/1994 | Asghar et al. | 375/99 |
| 5,369,791 | 11/1994 | Asghar et al. | 455/222 |
| 5,499,399 | 3/1996 | Bond et al. | 455/296 |
| 5,604,503 | 2/1997 | Fowler et al. | 342/378 |
| 5,648,822 | 7/1997 | Hulyalkar | 348/607 |
| 5,748,226 | 5/1998 | Linberg | 348/21 |
| 5,757,684 | 5/1998 | Zaugg | 364/724.19 |

FOREIGN PATENT DOCUMENTS

| | | |
|---|---|---|
| 0543213 | 10/1991 | European Pat. Off. . |
| 2227907 | 8/1990 | United Kingdom . |
| 95/06856 | 3/1995 | WIPO . |

OTHER PUBLICATIONS

Kammeyer, "On The Design of an Efficient Digital Broadcast FM Receiver", Signal Processing II: Theories and Applications, H.W. Schoessler (Editor), Elsevier Science Publishers B.V. (1983), pp. 355–358.

Kammeyer, et al., "A. Modified Adaptive FIR Equalizer for Multipath Echo Cancellation in FM Transmission", I.E.E.E. Journal on Selected Areas in Communications, SAC–5, No. 2, New York, NY, (Feb. 1987), pp. 226–237.

*Primary Examiner*—Stephen Chin
*Assistant Examiner*—Mohammad Ghayour

[57] ABSTRACT

Co-channel interference in baseband digital samples of an FM communications (e.g. AMPS) signal is cancelled by a complex signal limiter and non-linear filter (CLNF), to which the samples are supplied, and a time-varying null filter unit, to which the output samples from the CLNF are supplied, for separating the desired signal from residual interference. The output samples from the CLNF are also supplied via a selective narrow band filter bank to a non-linear transform unit for producing an energy based demodulation signal from which time-varying coefficients for the null filter are obtained. The units can be used individually or in different arrangements and combinations, and the transform unit can be augmented and used to replace a conventional FM demodulator.

47 Claims, 3 Drawing Sheets

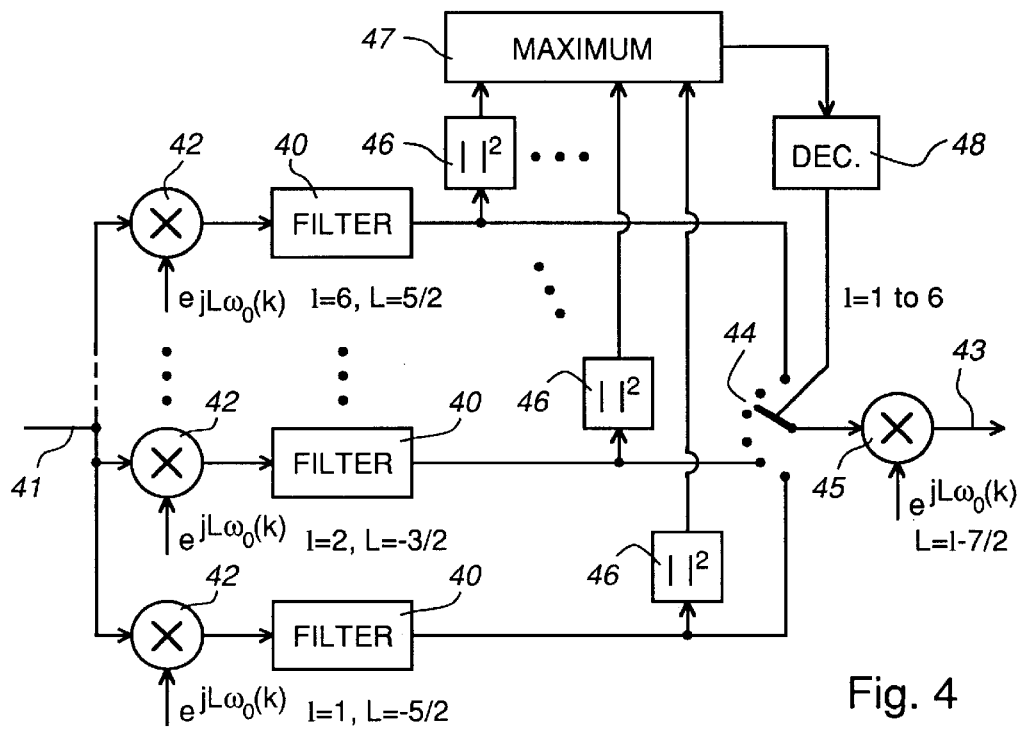
Fig. 4
Fig. 5
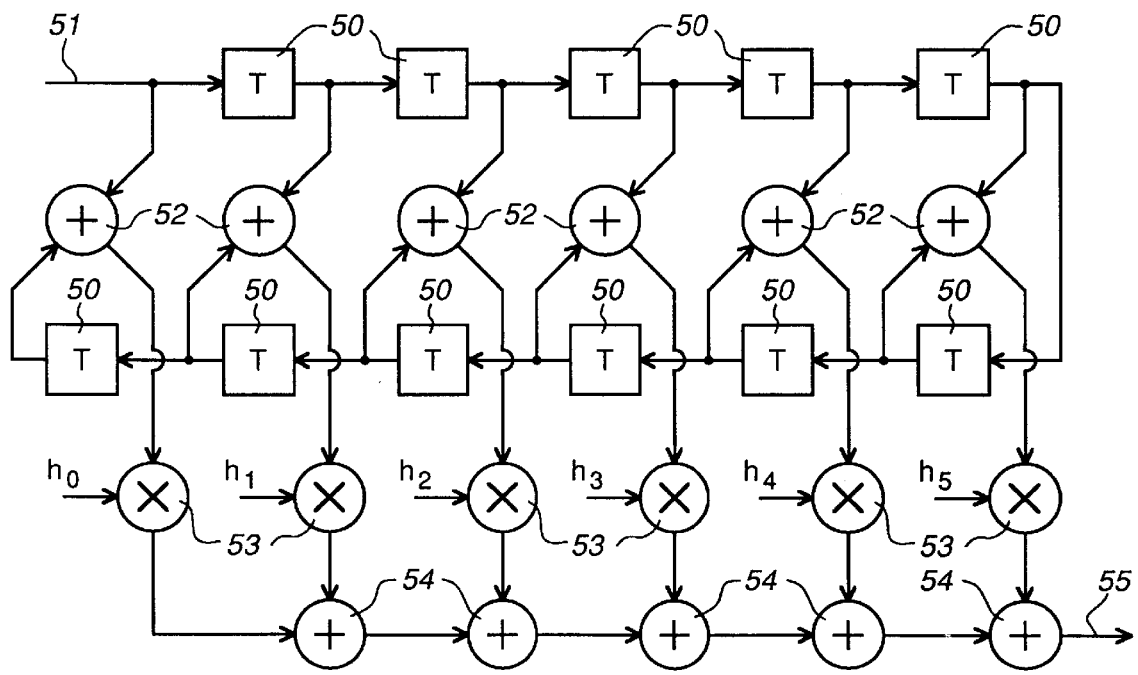

CO-CHANNEL INTERFERENCE REDUCTION

This application claims the benefit of U.S. Provisional Application No. 60/004,979 filed Oct. 10, 1995, the entire disclosure of which is hereby incorporated herein by reference.

This invention relates to reduction of co-channel interference in communications systems. The invention is particularly applicable to, but is not limited to, cellular radio or wireless communications systems using frequency modulation (FM) such as AMPS (Advanced Mobile Phone System), AMPS_WD (Wide-band Data AMPS), CDPD (Cellular Digital Packet Data) systems, and TDMA (Time Division Multiple Access) systems including GSM (Global System for Mobile Communications).

BACKGROUND OF THE INVENTION

Co-channel interference (CCI) is constituted by one or more interfering signals within the frequency band of a desired signal in a communications system, and is a key factor that limits the frequency reuse capacity of mobile communications systems. The CCI can not be reduced by conventional filtering techniques, because it falls within the bandwidth of the desired signal. Until now, it has been necessary in communications systems to provide a relatively high ratio of the desired signal strength to the interfering signal strength, generally referred to as the signal-to-interference or C/I ratio, in order to maintain effective communications. Little has been done to reduce CCI from a desired signal.

Harrington U.S. Pat. No. 5,084,899 issued Jan. 28, 1992 and entitled "Signal Suppressors" discloses an interference suppressor in which an amplitude limiter and bandpass filter is used to enhance the amplitude difference between a wanted signal and a dominant (i.e. greater amplitude) interfering signal, to enable the interfering signal to be subtracted from a received signal to leave only the wanted signal. This is an analog signal arrangement, and only works when the interfering signal is larger than the wanted signal, preferably by a large margin such as 18 dB, such as may be the case for example in a spread spectrum communications system.

An object of this invention is to provide methods and apparatus for reducing CCI from a desired signal.

SUMMARY OF THE INVENTION

One aspect of this invention provides a method of reducing co-channel interference with a desired signal in a predetermined frequency band in a received signal in a communications system, comprising the steps of: sampling the received signal to produce samples $x(k)$ each of which can be represented by a complex number; and limiting each sample in accordance with a function $x(k)/|x(k)|$ to produce a limited signal sample of the received signal.

This method preferably also comprises the step of filtering the limited signal samples of the received signal to remove components not in said frequency band. The method preferably comprises further reducing co-channel interference by the steps of: digitally processing the filtered limited signal samples to produce processed samples having components not in said frequency band; and filtering the processed samples to remove components not in said frequency band.

Another aspect of this invention provides a method of reducing co-channel interference in complex signal samples $x(k)$ of a baseband frequency modulated signal in a predetermined frequency band, comprising the steps of: limiting each complex signal sample to form a limited sample equal to $x(k)/|x(k)|$; and low pass filtering the limited signal samples to remove components not in the predetermined frequency band.

The methods recited above preferably further comprise the steps of filtering signal samples to form from each signal sample a plurality of filtered samples representing components of the signal sample in different narrow frequency bands within the predetermined frequency band; identifying one of the plurality of filtered samples having a maximum momentary energy; and selecting at least the identified one of the plurality of filtered samples as a signal sample having reduced co-channel interference. The step of filtering to form the plurality of filtered samples is desirably subsequent to the step of limiting each sample.

A further aspect of this invention provides a method of reducing co-channel interference with a desired signal in a predetermined frequency band in a received signal in a communications system, comprising the steps of: sampling the received signal to produce signal samples each of which can be represented by a complex number; filtering the signal samples to form from each signal sample a plurality of filtered samples representing components of the signal sample in different narrow frequency bands within the predetermined frequency band; identifying one of the plurality of filtered samples having a maximum momentary energy; and selecting at least the identified one of the plurality of filtered samples as a signal sample having reduced co-channel interference.

Desirably there are at least three of the different narrow frequency bands having equally spaced center frequencies, the step of filtering each signal sample to form different ones of the plurality of filtered samples comprises the step of frequency converting the signal sample to a common center frequency for all of the different narrow frequency bands, and the step of selecting at least the identified one of the plurality of filtered samples as a signal sample having reduced co-channel interference comprises the step of frequency converting each selected filtered sample back to its original center frequency.

A further aspect of this invention provides a method of reducing co-channel interference in signal samples of a baseband frequency modulated signal in a predetermined frequency band, comprising the steps of: filtering the signal samples to form from each signal sample a plurality of filtered samples representing components of the signal sample in at least three different narrow frequency bands having equally spaced center frequencies within the predetermined frequency band, the step of filtering to form different ones of the plurality of filtered samples comprising the step of frequency converting the signal sample to a common center frequency for all of the different narrow frequency bands; identifying one of the plurality of filtered samples having a maximum momentary energy; and selecting at least the identified one of the plurality of filtered samples as a signal sample having reduced co-channel interference, the step of selecting comprising the step of frequency converting each selected filtered sample back to its original center frequency.

In the above methods, preferably the step of filtering to form each of the plurality of filtered samples comprises the step of filtering in accordance with an angular prolate spheroidal function.

The above methods can further comprise the steps of delaying signal samples by two sampling periods to produce three consecutive samples s(k-1), s(k), and s(k+1), and producing a demodulation signal by determining at least a real part of $$-j\frac{s(k+1)s*(k-1)-s(k)s*(k)}{s(k+1)s*(k-1)+s(k)s*(k)}$$

where s*(k-1) and s*(k) are the complex conjugates of s(k-1) and s(k) respectively. Preferably the step of producing the demodulation signal is subsequent to the step of limiting each sample and/or the step of filtering the signal samples to produce the plurality of filtered samples.

Another aspect of this invention provides a method of processing signal samples of a frequency modulated signal, comprising the steps of: delaying signal samples by two sampling periods to produce three consecutive samples s(k-1), s(k), and s(k+1), and producing a demodulation signal by determining at least a real part of $$-j\frac{s(k+1)s*(k-1)-s(k)s*(k)}{s(k+1)s*(k-1)+s(k)s*(k)}$$

where s*(k-1) and s*(k) are the complex conjugates of s(k-1) and s(k) respectively.

The methods can further comprise the steps of: filtering signal samples in a time-varying null filter for the desired signal to produce error signal samples; determining time-varying coefficients for the null filter in dependence upon the demodulation signal; and subtracting the error signal samples from the signal samples to produce output signal samples.

The invention also provides a digital signal processor programmed and arranged for carrying out any of the methods recited above.

A further aspect of this invention provides apparatus for reducing co-channel interference in complex signal samples of a baseband frequency modulated signal in a predetermined frequency band, comprising: a complex signal limiter and non-linear filter for producing non-linear filtered, limited samples from the signal samples; a selective filter supplied with the non-linear filtered, limited samples for producing maximum momentary energy signal samples from different parts of the frequency band at different times; a non-linear transform unit for producing a demodulation signal from the maximum momentary energy signal samples produced by the selective filter; and a null filter unit responsive to the demodulation signal to provide time-varying null filter coefficients for separating a desired signal from co-channel interference in the non-linear filtered, limited signal samples.

Yet another aspect of this invention provides apparatus for reducing co-channel interference in complex signal samples x(k) of a baseband frequency modulated signal in a predetermined frequency band, comprising: a complex signal limiter (20) for producing limited signal samples x(k)/|x(k)| from the complex signal samples x(k); and a low pass filter (21) for filtering the limited samples. This apparatus preferably further comprises a non-linear filter for non-linearly filtering samples output from the low pass filter to produce non-linear filtered samples having further reduced co-channel interference.

A further aspect of the invention provides apparatus for reducing co-channel interference with complex signal samples of a desired signal in a predetermined frequency band in a received signal in a communications system, comprising: a filter for filtering signal samples to form from each signal sample a plurality of filtered samples representing components of the signal sample in different narrow frequency bands within the predetermined frequency band; a maximum energy selector for identifying one of the plurality of filtered samples having a maximum momentary energy; and a selector for selecting at least the identified one of the plurality of filtered samples as a signal sample having reduced co-channel interference.

A still further aspect of this invention provides apparatus for processing signal samples of a frequency modulated signal, the apparatus including a demodulator comprising delay elements for delaying signal samples by two sampling periods to produce three consecutive samples s(k-1), s(k), and s(k+1), and elements for producing a demodulation signal by determining at least a real part of $$-j\frac{s(k+1)s*(k-1)-s(k)s*(k)}{s(k+1)s*(k-1)+s(k)s*(k)}$$

where s*(k-1) and s*(k) are the complex conjugates of s(k-1) and s(k) respectively.

Advantageously this apparatus further comprises: a time-varying filter for filtering signal samples in dependence upon time-varying coefficients to produce error signal samples; a unit for determining the time-varying coefficients for the null filter in dependence upon the demodulation signal; and a unit for subtracting the error signal samples from the signal samples to produce output signal samples.

BRIEF DESCRIPTION OF THE DRAWINGS

The invention will be further understood from the following description with reference to the accompanying drawings, in which:

FIG. 4 schematically illustrates one embodiment of the filter bank;

FIG. 5 schematically illustrates a filter of the filter bank;

DETAILED DESCRIPTION

Figure 1:
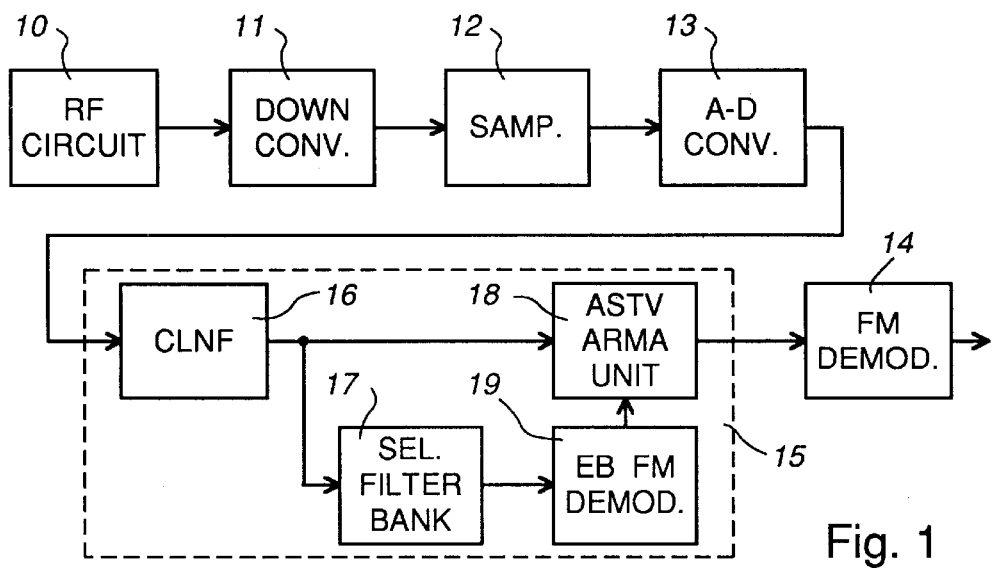
FIG. 1 schematically illustrates a block diagram of parts of a wireless digital communications receiver including a co-channel interference canceller (CCIC) in accordance with this invention.

Referring to FIG. 1, a block diagram illustrates pails of a wireless communications receiver, in which an FM communications signal is supplied via an RF (radio frequency) circuit 10 of a receiver to a down converter 11 to produce a signal which is sampled by a sampler 12, the samples being converted into digital form by an A-D (analog-to-digital) converter 13. The digital samples are conventionally supplied directly to an FM demodulator 14 for demodulation. In accordance with this invention, the samples are supplied to the demodulator 14 via a co-channel interference canceller (CCIC) 15 which is represented within a broken line box.

The CCIC 15 selves as described below to reduce (ideally to cancel) co-channel interference (CCI) signals which are within the bandwidth of the desired signal. Where the system is a cellular radio communications system, the CCI may for example be due to frequency reuse in other cells of the system, and/or it may originate from sources external to the communications system. As is well known, the digital signal samples are preferably processed in one or more DSP (digital signal processor) integrated circuits, which are desirably also used to implement the CCIC 15.

For simplicity, it is assumed in the following description that the desired signal occupies an AMPS voice channel, but it should be understood that the invention is applicable to other systems in which an FM signal (including frequency shift keyed signals) is subject to co-channel interference. As is well known, an AMPS voice channel has a bandwidth of 30 kHz and carries a constant (amplitude) envelope FM signal which comprises a voice signal with a modulation frequency in the range from 300 to 3400 Hz and a supervisory audio tone (SAT) with a modulation frequency around 6 kHz, and can also include a signalling tone (ST) with a modulation frequency of 10 kHz. The peak deviation, or range of frequency change, of these modulating signals, and of wide-band data which can also be carried by the voice channel, is typically 8 kHz or less. The sampling rate is about 48 kHz.

The CCIC 15 serves to improve the C/I (signal-to-interference) ratio of the sampled signal which is supplied to the demodulator 14, by a factor which is referred to as the gain of the CCIC. Because the CCI occurs within the frequency band of the desired signal, it can not be removed by conventional filtering. The CCIC 15 combines two techniques to reduce the CCI, these being non-linear filtering and linear time-varying filtering. However, it is observed that the invention is not limited to a combination of these techniques, and either of them may be used alone or they may be used together in different combinations as indicated further below.

More particularly, the CCIC 15 comprises a complex limiter and non-linear filter (CLNF) 16, a selective filter bank 17, an AMPS signal almost-symmetrical time-varying (ASTV) auto-regression moving average (ARMA) model and coefficient computing unit 18, and an energy-based (EB) FM demodulator 19. The CLNF 16 can be used alone or in combination with one or more of the units 17 to 19. Likewise, the selective filter bank 17 can be used alone or in combination with one or more of the units 16, 18, and 19. The unit 18 and the demodulator 19 can be used together on their own or in combination with either or both of the units 16 and 17. The demodulator 19 can be used, with an additional arctan determination as described below, to replace the FM demodulator 14, or on its own or in combination with either or both of the units 16 and 17. Thus the units of the CCIC 15 can be used in various combinations and different arrangements. However, an optimum CCIC gain is generally provided by using all four units in the arrangement illustrated in FIG. 1, and this arrangement is assumed for the remaining description. The following paragraphs provide an overview of the functions of these four units.

The CLNF 16 comprises a complex signal limiter followed by a non-lineal filter. In general, a received signal, comprising a mixture of a desired signal and an independent weaker (i.e. lower average power) CCI, has a non-constant envelope. The complex limiter converts the input mixture back to a constant envelope signal, transforming at least half of the CCI energy outside the bandwidth of the desired signal so that it can be filtered out by a low pass filter. Non-linear filtering or signal processing is then also used to enhance the CCIC gain due to the CLNF.

The selective filter bank 17 comprises a plurality of narrow bandwidth short impulse response (which are contradictory requirements) filters spanning the signal bandwidth, each of which is supplied with the complex signal. The output signal of the filter bank is selected from that filter having the maximum energy in its output at any instant, on the basis that the desired signal (especially after the CLNF processing) is stronger than the CCI and the two signal components generally have different instantaneous frequencies. The selective filter bank down converts the complex input signal in order to reduce processing requirements.

The ASTV ARMA model and coefficient computing unit 18 comprises an AMPS signal null filter using time-varying coefficients determined from the demodulator 19 in dependence upon the instantaneous frequency of the output signal from the filter bank 17. This enables the desired AMPS signal to be separated from the CCI, thereby enhancing the CCIC gain especially in the presence of Rayleigh fading, because the CCIC gain due to the CLNF 16 is dependent upon the C/I ratio and the distribution of the instantaneous frequencies of the desired signal and the interference.

The demodulator 19 is supplied with the momentary energy output (as distinct from the true signal waveform) of the selective filter bank 17 and uses this, with a nonlinear transformation of the input complex signal, for frequency detection to control the coefficients of the ASTV ARMA model in accordance with an inherent relationship between the parameters of the model and the instantaneous frequency (explained below) of the desired signal.

In the following, the desired AMPS signal is denoted as a complex signal $A_s e^{j\psi_s(k)}$ with in-phase and quadrature-phase components, where $A_s$ is the amplitude and $\psi_s(k)$ is the phase of each sample k of the complex signal. The first order difference of the phase is the instantaneous frequency $\dot{\psi}_s(k)$ referred to above, and the second order difference $\ddot{\psi}_s(k)$ is referred to as the variation speed of the instantaneous frequency. Thus $\dot{\psi}_s(k)=\psi_s(k)-\psi_s(k-1)$ and $\ddot{\psi}_s(k)=\dot{\psi}_s(k)-\dot{\psi}_s(k-1)$.

Figure 2:
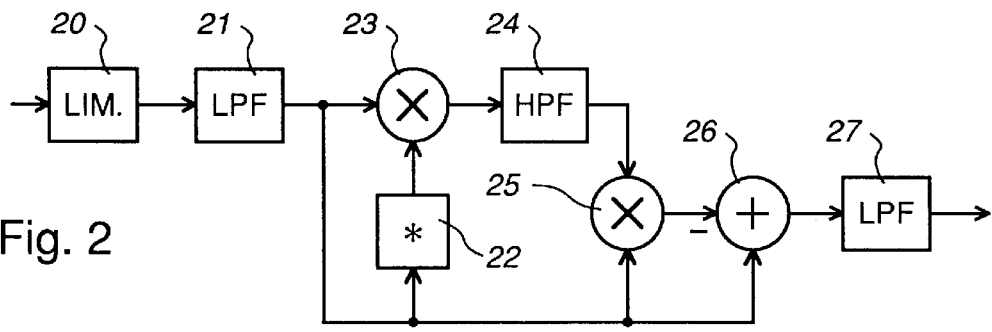
FIG. 2 schematically illustrates a complex limiter and non-linear filter (CLNF) of the CCIC.

Referring to FIG. 2, the CLNF 16 comprises a complex signal limiter 20, low pass filters (LPFs) 21 and 27, a complex conjugate function 22, complex signal multipliers 23 and 25, a high pass filter (HPF) 24, and a complex signal adder 26. Each of the LPFs 21 and 27 provides low pass filtering of each of the real and imaginary components of the complex signal supplied to it, and has a bandwidth of 15 kHz corresponding to that of the desired signal (30 kHz, this being centered on 0 kHz for the LPF). As indicated above, the functions of the CLNF are conveniently implemented in a DSP; thus for example a single LPF function of the DSP can be used to implement both LPFs 21 and 27. Each LPF preferably has a short impulse response to reduce processing delay, and for example can be a Butterworth or Gaussian filter.

The complex limiter 20 is supplied with an input signal x(k) which is assumed to be a mixture of a desired signal as indicated above and a weaker CCI signal having amplitude $A_i$ and phase $\psi_i(k)$. Thus $$x(k)=A_s e^{j\psi_s(k)}+A_i e^{j\psi_i(k)} \qquad (1)$$

The complex limiter 20 produces a complex output signal $x_{lim}(k)$ in accordance with the non-linear function:

$$x_{\lim}(k) = \frac{x(k)}{|x(k)|} = \frac{x(k)}{(x(k)x*(k))^{0.5}} \quad (2)$$

where $x*(k)$ is the complex conjugate of $x(k)$. Putting $\beta=A_i/A_s$ and assuming that the C/I ratio is high, i.e. $\beta<<1$, then using Taylor expansion and neglecting higher-order terms gives $$x_{\lim}(k) = e^{j\psi_s(k)} + \frac{\beta}{2}e^{j\psi_i(k)} - \frac{\beta}{2}e^{j(2\psi_s(k)-\psi_i(k))} \quad (3)$$

from which it can be seen that the signal to interference ratio is $1/(2(\beta/2)^2)$, so that the CCIC gain of the complex limiter 20 is 3 dB. A second order Taylor expansion can be carried out, from which it can be determined that an upper bound of the complex limiter CCIC gain is $2(1-1.31\beta^2)$, which approaches 3 dB as $\beta$ approaches zero.

This CCIC gain of the complex limiter 20 is enhanced by the remainder of the CLNF 16. More particularly, the units 21 to 27 of the CLNF 16 serve to reduce the dominant or first order CCI terms in the output of the complex limiter 20, i.e. the second and third terms in equation (3) above.

The output of the complex limiter 20 is filtered by the LPF 21, whose output is supplied to one input of each of the complex multipliers 23 and 25, to one input of the complex adder 26, and via the complex conjugate function 22 to a second input of the complex multiplier 23. The output of the complex multiplier 23 is supplied via the HPF 24, which selves to remove d.c. components and can for example be an IIR (infinite impulse response) filter having a characteristic of the form $(1-z^{-1})/(1-0.95\ z^{-1})$, to a second input of the complex multiplier 25, whose output is supplied to a subtracting input of the complex adder 26. The output of the complex adder 26 is low pass filtered by the LPF 27.

The operation of the units 21 to 27 is explained below with reference to two cases. For convenience, the terminology $x_N(k)$ is used to denote the output signal from the unit having the reference N. For example, $x_{21}(k)$ refers to the output of the LPF 21.

CASE 1

Instantaneous Frequency Difference $2\dot{\psi}_s(k)-\dot{\psi}_i(k)$ is Within the LPF Bandwidth In this case the output $x_{27}(k)$ is the same as the input $x_{lim}(k)$. This can be seen from the fact that the LPF 21 has no effect so that $x_{21}(k)=x_{lim}(k)$, with the result that $x_{23}(k)=x_{21}(k)x_{22}(k)=x_{21}(k)x_{21}*(k)=1$. This is a d.c. component which is eliminated by the HPF 24 so that $x_{24}(k)=0$, and hence $x_{25}(k)=0$. Hence $x_{26}(k)=x_{21}(k)=x_{lim}(k)$ which is within the bandwidth of the LPF 27 so that $x_{27}(k)=x_{lim}(k)$. Thus there is no improvement in the CCIC gain of 3 dB due to the CLNF 16 in this case.

CASE 2

Instantaneous Frequency Difference $2\dot{\psi}_s(k)-\dot{\psi}_i(k)$ is Outside the LPF Bandwidth The LPF 21 filters out the third term in equation (3). Consequently, the output signals of the units 21 and 23 to 27, neglecting second order ($\beta^2$) terms at the output of the complex multiplier 25, are given by the following equations:

$$x_{21}(k) = e^{j\psi_s(k)} + \frac{\beta}{2}e^{j\psi_i(k)} \quad (4)$$

$$x_{23}(k) = 1 + 2\left(\frac{\beta}{2}\right)^2 + \frac{\beta}{2}e^{j(\psi_i(k)-\psi_s(k))} + \frac{\beta}{2}e^{j(\psi_s(k)-\psi_i(k))} \quad (5)$$

$$x_{24}(k) = \frac{\beta}{2}e^{j(\psi_i(k)-\psi_s(k))} + \frac{\beta}{2}e^{j(\psi_s(k)-\psi_i(k))} \quad (6)$$

$$x_{25}(k) = \frac{\beta}{2}e^{j\psi_i(k)} + \frac{\beta}{2}e^{j(2\psi_s(k)-\psi_i(k))} \quad (7)$$

$$x_{26}(k) = e^{j\psi_s(k)} - \frac{\beta}{2}e^{j(2\psi_s(k)-\psi_i(k))} \quad (8)$$

$$x_{27}(k) = e^{j\psi_s(k)} \quad (9)$$

Thus in this case the first order terms in equation (3) above are cancelled, and the CCIC gain due to the CLNF 16 becomes very large (ideally infinite).

Assuming that the two cases above are equally probable, there is an average improvement of the CCIC due to the CLNF 16 by a factor of 2 over the complex limiter 20 alone, and a total CCIC gain for the CLNF 16 approaching 6 dB as $\beta$ approaches 0. However, the dependence of this CCIC gain on $\beta$ makes it desirable for other CCIC processing to be performed especially to accommodate Rayleigh fading to which cellular communications systems are subject. The units 17 to 19 of the CCIC 15 are useful in this respect.

As outlined above, the selective filter bank 17 serves to track and supply to its output the momentary energy of the desired signal, which being an FM signal varies over time across the signal bandwidth in a manner which is generally different from and independent of the weaker CCI. Consequently, the selective filter bank comprises a plurality of filters the output of any one of which, having the greatest energy output, is selected as an output from the selective filter bank. Outputs of more than one, but less than all, of the filters in the filter bank could alternatively be combined to provide an output signal, but this would result in a more complicated arrangement. For example, the filter having the greatest energy output could be identified and the output of this filter could be summed with the output(s) of the one or two filter(s) having adjacent responses to produce a resultant output signal from the filter bank.

The operation and effectiveness of the selective filter bank 17 depend on the number of filters and their characteristics. In particular, there are contradictory desires for a large number of filters of narrow bandwidth for selectivity, a small number of filters to reduce processing requirements, a sufficient bandwidth to be responsive to the variation speed of the instantaneous frequency of the desired signal, a minimum length impulse response for time resolution, and a combined flat and linear phase response. An advantageous compromise among these desires is adopted in the embodiment of the selective filter bank described below, which uses six FIR (finite impulse response) filters with a design based on the prolate spheroidal function to provide a minimal product of the filter bandwidth and impulse response duration.

Figure 3:
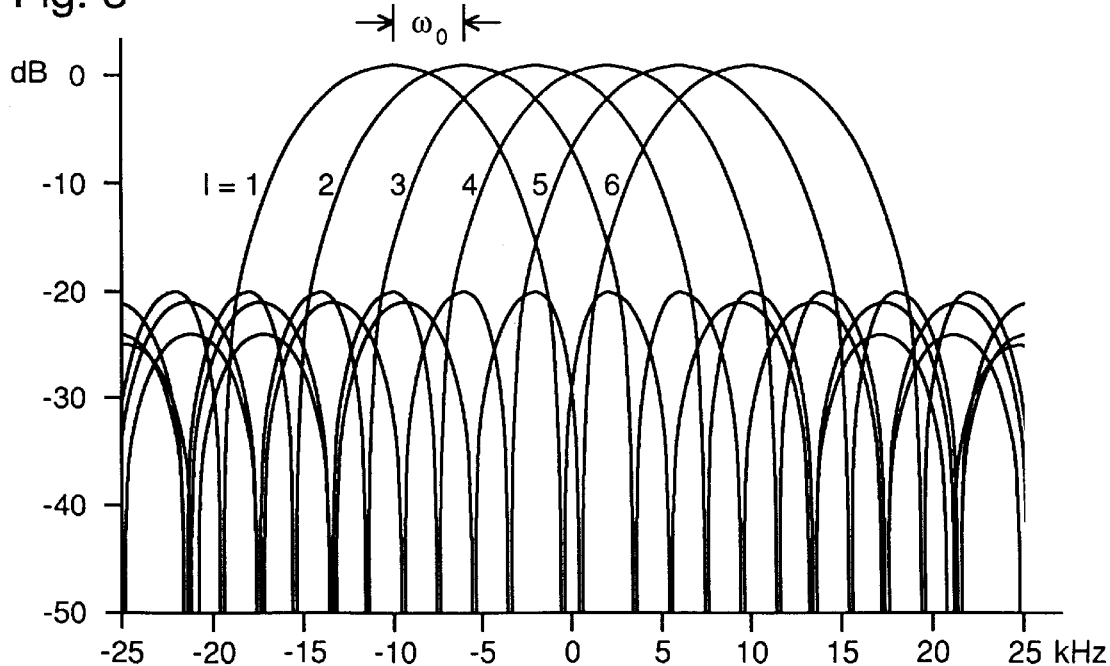
FIG. 3 illustrates characteristics of a selective filter bank of the CCIC.

FIG. 3 illustrates the frequency response of the filter bank 17, showing clearly the overlapping primary lobes of the six filters spanning the bandwidth of the desired signal. FIG. 4 illustrates one embodiment of the selective filter bank, including six filters 40 having the respective response characteristics shown in FIG. 3, to which the complex input signal to the filter bank 17 is supplied via an input line 41. In order to simplify implementation of the selective filter bank 17 in a DSP, so that all of the filters 40 can have a single implementation, the complex input signal on the line 41 is down-shifted in frequency by multiplying it, in a respective complex signal multiplier 42, by respective carrier frequency samples $e^{jL\omega_0(k)}$, where L=l-7/2, l is an index from 1 to 6 of the respective filter, and $\omega_0$ is the spacing between the center frequencies of the filters 40. The index l for each filter response is indicated in FIG. 3, which also indicates the frequency spacing $\omega_0$. The resulting complex signal centered at 0 kHz is supplied to the filter 40. Each carrier frequency sample $e^{jL\omega_0(k)}$ can conveniently be produced by a complex signal multiplier having one input supplied with a canter signal and the other input supplied from its output via a delay element of one sampling period, for example in accordance with the equation $e^{jL\omega_0(k)}=e^{jL\omega_0(k-1)}e^{j\omega_0}$.

Conversely, the output of a selected one of the filters 40 is supplied to an output line 43 via a selection switch 44 and a frequency up-shifter 45 also constituted by a complex signal multiplier and supplied with the respective carrier frequency signal $e^{jL\omega_0(k)}$, where L=l-7/2 as above and l is the index of the selected filter.

The complex signal outputs of the filters 40 are supplied to respective energy calculator units 46, which can each comprise a complex conjugate function and a complex signal multiplier arranged similarly to the units 22 and 23 in FIG. 2. A maximum energy selector 47 is supplied with the outputs of the units 46 and determines the index l of the filter 40 having the maximum energy output, this index l being supplied to the selection switch 44 to switch the output of the maximum-energy filter to the up-shifter 45, the index l also determining the carrier frequency supplied to the up-shifter 45. In order to reduce processing requirements, and in view of a relatively slow rate of change of the selection index l compared with the sampling rate, the selection index l can be supplied from the maximum energy selector 47 via a decimator 48 for example having a decimation factor of 2 (i.e. ignoring alternate determinations of the selection index l).

As indicated above, each filter 40 is desired to have both a narrow bandwidth and a short impulse response. These contradictory desires are resolved by using a prolate spheroidal wave function based FIR filter design technique. Prolate spheroidal functions are a set of eigen functions which satisfy the following integral equation:

$$\int_{-B/2}^{B/2} \frac{\sin(\pi T_w(f-\eta))}{\pi(f-\eta)} S_n(\eta) d\eta = \lambda_n S_n(f) \quad n = 0, 1, 2, 3, \ldots \quad (10)$$

where $\eta$ is the integral variable, B is the filter bandwidth, f denotes frequency, $T_w$ is the sampling interval, $S_n$ is an eigen function constituting the frequency response of the filter, and $\lambda_n$ is the eigen value for different solutions identified by n.

The left-hand side of the above integral equation means that a signal is truncated by a time window, and the right-hand side is the product of the original signal and an eigen value. The signal with the largest eigen value $\lambda_n$ contains the most energy after the truncation.

In order to minimize both (e.g. the product of) the filter bandwidth and the impulse response duration, each filter 40 is designed as a band limited filter using the truncated prolate spheroidal function. The truncating time window causes the filter to be no longer band limited, and there are two types of err ors introduced, namely an in-band truncation error and an aliasing error. A filter impulse response is desired which minimizes both of these errors, and this is done by solving the above integral equation and selecting the eigen function $S_n$ which has the largest eigen value $\lambda_n$.

The tap coefficients of the filter are the samples of an angular prolate spheroidal function.

Because a closed form solution of the angular prolate spheroidal function is very difficult to obtain, a numerical solution can be used as described by Rui Wang in "Asynchronous Sampling Data Receiver", Ph.D. Dissertation, University of Toronto, Canada, October 1986 to provide the filter response shown in FIG. 3 with the coefficients detailed below.

As already described above, the input signal spectrum is frequency down-shifted by equally spaced carrier frequencies so that all of the filters 40 can be implemented by a single filter with reduced processing requirements, because the filter coefficients are then real rather than complex numbers. Furthermore, the filter is designed as a symmetrical FIR filter in order to halve the number of multiplications required. The resulting filter design is shown in FIG. 5.

Referring to FIG. 5, the filter 40 comprises a delay line of eleven complex signal delay elements 50 each providing a delay of one sampling period T, via which the complex input signal on a line 51 is passed. Six complex signal adders 52 sum the complex signals at symmetrical points along the delay line, i.e. from the line 51 and the output of the eleventh delay element, and from the outputs of the first and tenth, second and ninth, third and eighth, fourth and seventh, and fifth and sixth delay elements 50 respectively. The resulting complex signal sums are multiplied by real coefficients $h_0$ to $h_5$ respectively in six complex-real multipliers 53, the complex signal outputs of which are summed in another five complex signal adders 54 to provide a complex signal output on a line 55. As described above, the coefficients $h_0$ to $h_5$ are numerically determined to have the values in the following table:

| $h_0$ | $h_1$ | $h_2$ | $h_3$ | $h_4$ | $h_5$ |
| --- | --- | --- | --- | --- | --- |
| 0.0510 | 0.0595 | 0.0728 | 0.0888 | 0.1033 | 0.1120 |

The energy-based FM demodulator 19 serves to retrieve the modulating signal from a non-linear transform of the FM signal output from the selective filter bank 17. To this end, it makes use of the two following non-linear transformations:

$$\Psi_0(k) = \begin{vmatrix} Ae^{j\psi(k+1)} & Ae^{-j\psi(k)} \\ Ae^{j\psi(k)} & Ae^{-j\psi(k-1)} \end{vmatrix} = A^2 e^{j(\psi(k+1)-\psi(k-1))} - A^2 \quad (11)$$

$$= A^2(e^{j\dot\psi(k+1)} - 1) = 2jA^2 e^{j\dot\psi(k+1)} \sin(\dot\psi(k+1))$$

$$\Psi_1(k) = \begin{vmatrix} Ae^{j\psi(k+1)} & -Ae^{-j\psi(k)} \\ Ae^{j\psi(k)} & Ae^{-j\psi(k-1)} \end{vmatrix} = A^2 e^{j(\psi(k+1)-\psi(k-1))} + A^2 \quad (12)$$

$$= A^2(e^{j\dot\psi(k+1)} + 1) = 2jA^2 e^{j\dot\psi(k+1)} \cos(\dot\psi(k+1))$$

The norm of the transformed signal represents the energy of the FM signal, so that such transformations can be used to detect and track the momentary energy of the FM signal, which varies with instantaneous frequency.

Applying these transformations, it can be seen that the FM signal can be demodulated by applying the equation:

$$\tan(\dot\psi(k+1)) = \frac{\sin(\dot\psi(k+1))}{\cos(\dot\psi(k+1))} = -j\frac{\Psi_0(k)}{\Psi_1(k)} \quad (13)$$

so that $\dot\psi(k+1)=\text{atan}(-j\Psi_0(k)/\Psi_1(k))$.

The demodulator 19 uses a construction of the above non-linear transforms applied to three consecutive samples k−1, k, and k+1 of the complex input signal supplied to the demodulator, demodulation being performed on the transformed signals, in accordance with the following equations:

$$\Psi_0[s(k)] = s(k+1)s*(k-1) - s(k)s*(k) \tag{14}$$

$$\Psi_1[s(k)] = s(k+1)s*(k-1) + s(k)s*(k) \tag{15}$$

$$\tan(\dot{\psi}(k+1)) = Re\left\{-j\frac{\Psi_0(k)}{\Psi_1(k)}\right\} \tag{16}$$

Figure 6:
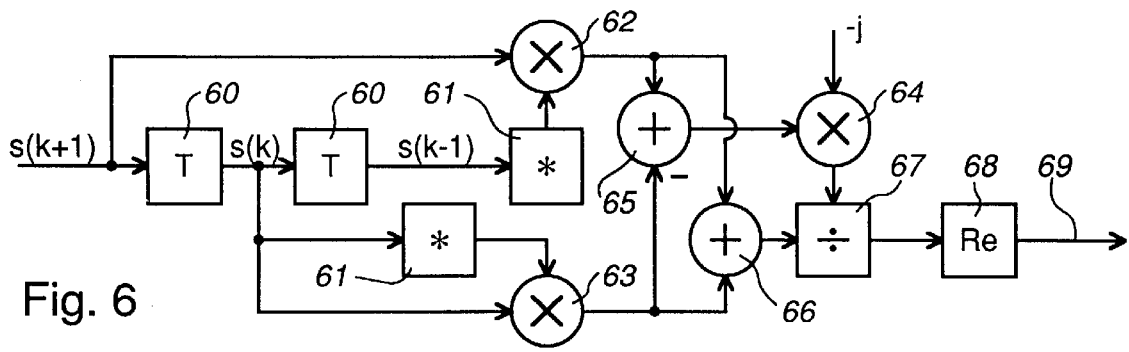
FIG. 6 schematically illustrates an energy-based (EB) FM demodulator of the CCIC.

FIG. 6 illustrates a form of the demodulator 19 for implementing equations (14) to (16), comprising two complex signal delay elements 60 each providing a delay of one sampling period T, two complex conjugate functions 61, three complex signal multipliers 62 to 64, two complex signal adders 65 and 66, a complex signal divider 67, and a function 68 which outputs on a line 69 the real part (denoted Re{ } in equation (16)) of the division result. The functions 61 produce the complex conjugates in the transform equations (14) and (15) from the outputs of the delay elements 60, and the complex signal multipliers 62 and 63 produce the products in these equations. The adders 65 and 66 produce the complex difference and sum, respectively, of the outputs of the multipliers, thereby producing values of $\Psi_0$ and $\Psi_1$ respectively. The former value is multiplied by −j in the complex signal multiplier 64, and the product is divided by the output of the adder 66 in the complex signal divider 67. The real part of the division result is supplied to the output line 69 by the function 68.

As can be seen from the description above, the output of the demodulator 19 on the line 69 represents tan ($\dot{\psi}$(k+1)). This signal is used directly by the ASTV ARMA unit 18 as described below. If the demodulator 19 is used in place of the conventional FM demodulator 14, or if an actual FM demodulated signal is required from the output of the demodulator 19, then an additional arctan function or lookup table is required to convert the tan ($\dot{\psi}$(k+1)) signal on the line 69 to the FM demodulated signal $\dot{\psi}$(k+1).

Again, it can be appreciated from the above description that all of the functions of the demodulator 19 can conveniently be provided in a DSP. It can be shown mathematically and demonstrated that the demodulator 19 as described above provides a significant suppression of audible clicks introduced by CCIs, in comparison to conventional FM discriminators.

Figure 7:
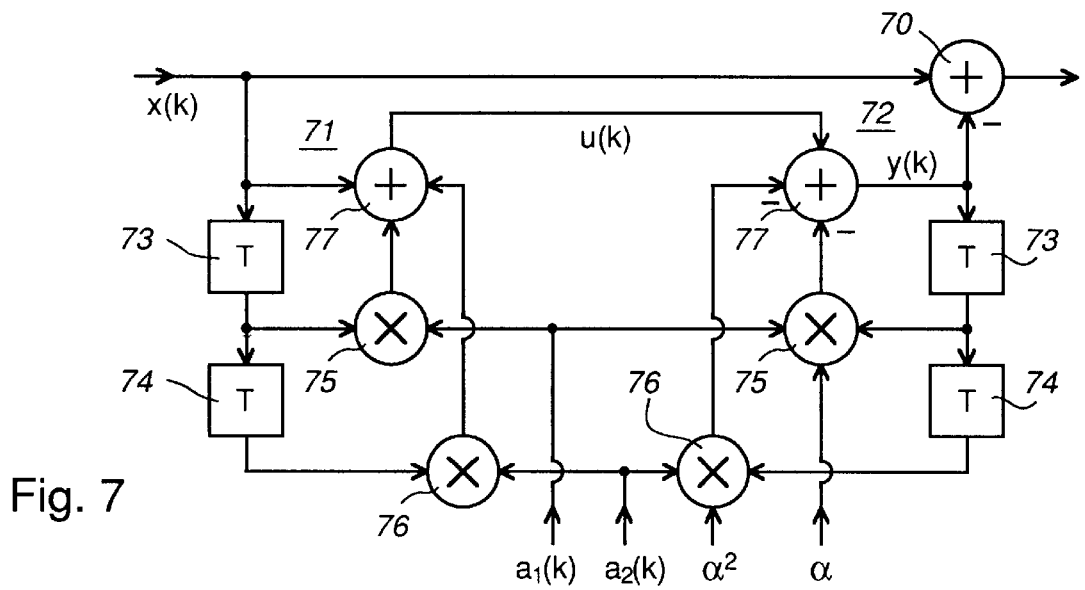
FIG. 7 schematically illustrates an AMPS signal almost-symmetrical time-varying (ASTV) auto-regression moving average (ARMA) model unit of the CCIC.
Figure 8:
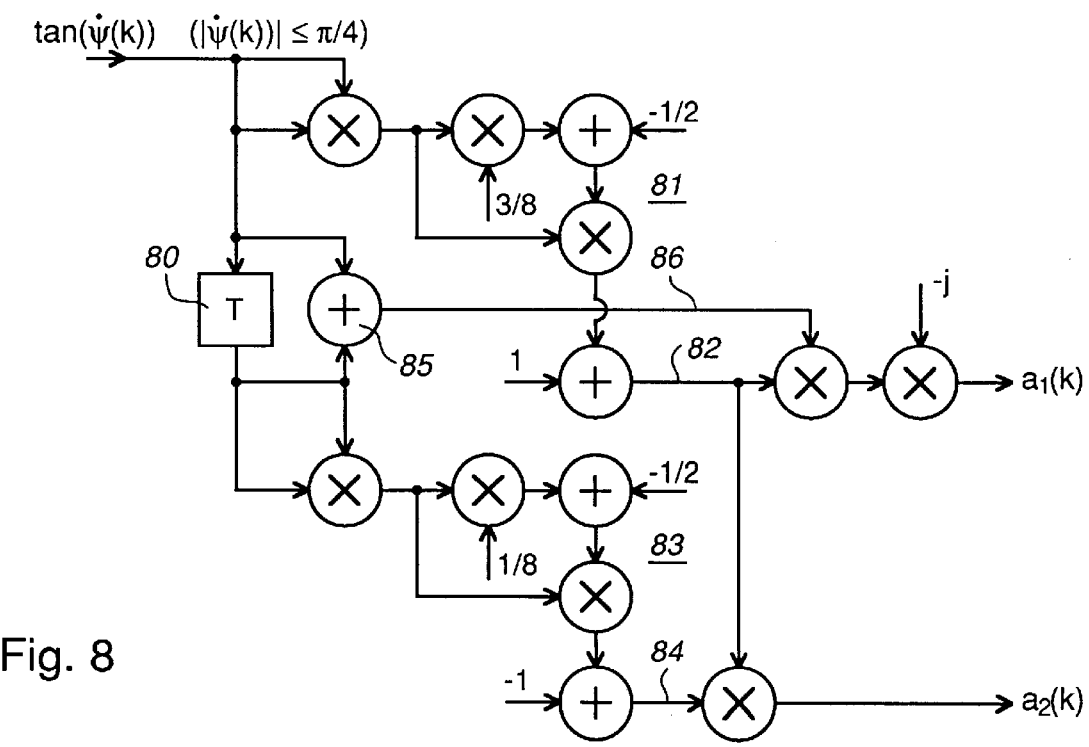
FIG. 8 schematically illustrates one embodiment of a coefficient computing unit of the ASTV ARMA model unit.

As explained above, the ASTV ARMA model and coefficient computing unit 18 serves to enhance the CCIC gain especially in the presence of Rayleigh fading, being controlled in dependence upon the instantaneous frequency of the desired signal. To this end, the unit 18 comprises a time-varying null filter for the desired signal, to which an incoming signal mixture of the desired signal and CCI is supplied and which nulls the desired signal to produce only the CCI at its output, an adder arranged to subtract the output of the null filter from the incoming signal mixture to produce an output signal of the unit 18 and hence of the CCIC 15, and a computing unit for determining time-varying coefficients for the null filter in dependence upon the instantaneous frequency of the desired signal as determined by the EB FM demodulator 19. FIG. 7 illustrates an embodiment of the null filter and adder, and FIG. 8 illustrates an embodiment of the computing unit.

A model of the desired signal is needed in order to determine an appropriate form of the time-varying null filter.

A general design principle for an ASTV ARMA model is described by Wen Tong in "Almost Symmetrical Time-Varying ARMA Model And Its Application For Separation Of Superimposed Signals With Overlapping Fourier Spectra", Ph.D. Dissertation, Concordia University, Montreal, Canada, May 1993. It is assumed here that the desired signal is an AMPS signal $e^{j\psi(k-m)}$, and an auxiliary function $(-1)^{m+1}e^{j\psi(k-m)}$ is chosen to provide a set of linearly independent functions:

$$\{e^{j\psi(k-m)}, (-1)^{m+1}e^{j\psi(k-m)}\} \quad k, m=1, 2, \ldots \tag{17}$$

For an AMPS signal, the instantaneous frequency $\dot{\psi}$ is within the range from $-\pi/2$ to $\pi/2$, so that the Wronskian associated with this set of functions is always positive:

$$\begin{vmatrix} e^{j\psi(k)} & -e^{-j\psi(k)} \\ e^{j\psi(k-1)} & e^{-j\psi(k-1)} \end{vmatrix} = 2\cos(\psi(k) - \psi(k-1)) = 2\cos(\dot{\psi}(k)) > 0 \tag{18}$$

It is known that if a set of linear independent functions has a positive definite Wronskian, then a linear homogeneous equation can be constructed as:

$$s(k)+a_1(k)s(k-1)+a_2(k)s(k-2)=0 \tag{19}$$

where $a_1(k)$ and $a_2(k)$ are time-varying coefficients. These two coefficients can be explicitly found by first constructing an augmented Wronskian:

$$\begin{vmatrix} e^{j\psi(k-0)} & -e^{-j\psi(k-0)} & s(k-0) \\ e^{j\psi(k-1)} & -e^{-j\psi(k-1)} & s(k-1) \\ e^{j\psi(k-2)} & -e^{-j\psi(k-2)} & s(k-2) \end{vmatrix} = 0 \tag{20}$$

and using Laplacian minor expansion to give:

$$a_1(k) = -\frac{-\begin{vmatrix} e^{j\psi(k-0)} & -e^{-j\psi(k-0)} \\ e^{j\psi(k-2)} & -e^{-j\psi(k-2)} \end{vmatrix}}{\begin{vmatrix} e^{j\psi(k-1)} & -e^{-j\psi(k-1)} \\ e^{j\psi(k-2)} & -e^{-j\psi(k-2)} \end{vmatrix}} = -j\frac{\sin(\dot{\psi}(k) + \dot{\psi}(k-1))}{\cos(\dot{\psi}(k-1))} \tag{21}$$

$$a_2(k) = \frac{\begin{vmatrix} e^{j\psi(k-0)} & -e^{-j\psi(k-0)} \\ e^{j\psi(k-1)} & -e^{-j\psi(k-1)} \end{vmatrix}}{\begin{vmatrix} e^{j\psi(k-1)} & -e^{-j\psi(k-1)} \\ e^{j\psi(k-2)} & -e^{-j\psi(k-2)} \end{vmatrix}} = -\frac{\cos(\dot{\psi}(k))}{\cos(\dot{\psi}(k-1))} \tag{22}$$

The homogeneous linear equation (19) represents a null filter which, with the time-varying coefficients $a_1(k)$ and $a_2(k)$ defined by equations (21) and (22), dependent upon the instantaneous frequency $\dot{\psi}$ of the AMPS signal, completely nulls or cancels the AMPS signal synchronously and independently of its amplitude.

Based on this, a second order time-varying null filter for an AMPS signal to be used in the unit 18 is defined by the equations:

$$u(k)=x(k)+a_1(k)x(k-1)+a_2(k)x(k-2) \tag{23}$$

$$y(k)=u(k)-\alpha a_1(k)y(k-1)-\alpha^2 a_2(k)y(k-2) \tag{24}$$

where x(k) is the input signal to the null filter (constituted by the output signal $x_{lim}(k)$ of the CLNF 16 in FIG. 2), y(k) is the output signal from the null filter, u(k) is an intermediate signal, α is a constant symmetry factor and for example is equal to 0.99, and $a_1(k)$ and $a_2(k)$ are the time-varying coefficients as defined above.

FIG. 7 illustrates a time-varying null filter which implements equations (23) and (24), together with an adder 70 which as described above subtracts the output signal y(k) of the null filter from the input signal x(k) to produce an output signal of the unit 18. The null filter comprises two parts 71 and 72 which respectively produce the intermediate signal u(k) from the input signal x(k) and produce the output signal y(k) from the intermediate signal u(k), each part comprising two complex signal delay elements 73 and 74 each providing a delay of one sampling period T, two complex signal multipliers 75 and 76 supplied with the outputs of the delay elements 73 and 74 respectively and with the coefficients $a_1(k)$ and $a_2(k)$ respectively for forming the products in equations (23) and (24), and a complex signal adder 77 for producing the signal u(k) or y(k) respectively. The two parts 71 and 72 are similar, except that in the part 72 the multipliers 75 and 76 are also supplied with the factors α and $\alpha^2$ respectively and their outputs are supplied to subtractive inputs of the adder in accordance with the negative signs in equation (24).

As so far described, the output of the demodulator 19 on the line 69 represents the tangent of the instantaneous frequency, i.e. $\tan(\dot{\psi}(k+1))$, or simply $\tan(\dot{\psi}(k))$ with a renumbering of the samples, whereas the time-varying coefficients $a_1(k)$ and $a_2(k)$ for the null filter in the unit 18 are expressed in terms of the sine and cosine of the instantaneous frequency. Obviously, as described above the demodulator 19 can be supplemented with an arctan function to produce a complex signal representing the instantaneous frequency $\dot{\psi}(k)$, and this can be used in sine and cosine functions to produce the coefficients $a_1(k)$ and $a_2(k)$ as described above. However, less processing is required in a DSP constituting the demodulator 19 and the computing unit of the unit 18 if the coefficients $a_1(k)$ and $a_2(k)$ are calculated directly from the tangent function output of the demodulator 19 on the line 69. This is done in the manner described below.

The above equations for the time-varying coefficients $a_1(k)$ and $a_2(k)$ can be rewritten in terms of multiplications of the tangent, cosine, and secant of the instantaneous frequency as follows:

$$a_1(k) = -j(\tan(\dot{\psi}(k)) + \tan(\dot{\psi}(k-1))) \cos(\dot{\psi}(k)) \quad (25)$$

$$a_2(k) = -\cos(\dot{\psi}(k)) \sec(\dot{\psi}(k-1)) \quad (26)$$

In addition, if the instantaneous frequency satisfies the condition $|\dot{\psi}(k)| \leq \pi/4$, i.e. if $|\tan(\dot{\psi}(k))| \leq 1$, then the cosine and secant functions can be expanded as follows:

$$\cos(\dot{\psi}(k)) = (1 + \tan^2(\dot{\psi}(k)))^{-1/2} = 1 - \frac{1}{2}\tan^2(\dot{\psi}(k)) + \frac{3}{8}\tan^4(\dot{\psi}(k)) \quad (27)$$

$$\sec(\dot{\psi}(k)) = (1 + \tan^2(\dot{\psi}(k)))^{1/2} = 1 + \frac{1}{2}\tan^2(\dot{\psi}(k)) - \frac{1}{8}\tan^4(\dot{\psi}(k)) \quad (28)$$

In accordance with equations (27) and (28), the time-varying coefficients $a_1(k)$ and $a_2(k)$ can be determined directly from the $\tan(\dot{\psi}(k))$ signal on the line 69 using real signal adders and multipliers, and a real signal delay element providing a delay of one sampling period T, for example as illustrated in FIG. 8.

Referring to FIG. 8, a delay unit 80 produces the signal $\tan(\dot{\psi}(k-1))$ from the input signal $\tan(\dot{\psi}(k))$. A first group of three multipliers and two adders collectively referenced 81 implements equation (27) to produce a $\cos(\dot{\psi}(k))$ signal on a line 82. A second group of three multipliers and two adders collectively referenced 83 implements equation (28) to produce a $-\sec(\dot{\psi}(k-1))$ signal on a line 84. An adder 85 produces the sum $\tan(\dot{\psi}(k)) + \tan(\dot{\psi}(k-1))$ on a line 86, and a further three multipliers produce the time-varying coefficients $a_1(k)$ and $a_2(k)$ from the signals on the lines 82, 84, and 86 in accordance with equations (25) and (26).

If the instantaneous frequency does not satisfy the above condition, then instead the condition $\pi/4 < |\dot{\psi}(k)| < \pi/2$ is satisfied. In this case it is normal for a DSP which implements the division function 67 in the demodulator 19 to exchange the numerator and denominator of the division so that its output remains no greater than one, and consequently the output of the demodulator 19 on the line 69 becomes $\cot(\dot{\psi}(k))$ instead of $\tan(\dot{\psi}(k))$. An output of the division function indicating this exchange is used to switch the coefficient computing unit in the unit 18 from the arrangement shown in FIG. 8 to a modified arrangement which implements the following alternative expressions and expansions, in terms of $\cot(\dot{\psi}(k))$, for the time-varying coefficients $a_1(k)$ and $a_2(k)$:

$$a_1(k) = -j(\cot(\dot{\psi}(k)) + \cot(\dot{\psi}(k-1))) \sin(\dot{\psi}(k)) \tan(\dot{\psi}(k-1)) \quad (29)$$

$$a_2(k) = -\cos(\dot{\psi}(k)) \sec(\dot{\psi}(k-1)) \quad (30)$$

$$\sin(\dot{\psi}(k)) = (1 + \cot^2(\dot{\psi}(k)))^{-1/2} = 1 - \frac{1}{2}\cot^2(\dot{\psi}(k)) + \frac{3}{8}\cot^4(\dot{\psi}(k)) \quad (31)$$

$$\sec(\dot{\psi}(k)) = \tan(\dot{\psi}(k))(1 + \cot^2(\dot{\psi}(k)))^{1/2} \quad (32)$$
$$= \tan(\dot{\psi}(k)) + \frac{1}{2}\cot(\dot{\psi}(k)) - \frac{1}{8}\cot^3(\dot{\psi}(k))$$

$$\cos(\dot{\psi}(k)) = \cot(\dot{\psi}(k))\sin(\dot{\psi}(k)) \quad (33)$$

A detailed form of the coefficient computing unit of the unit 18 for this case is not illustrated but can be implemented in a manner generally similar to the form of the unit shown in FIG. 8 for the previous case.

The unit 18 is particularly advantageous in that it can retrieve a desired AMPS signal in the presence of Rayleigh fading and multipath fading, and provides a constant envelope output signal which is relatively free of CCI. Furthermore, the unit 18 can retrieve a desired AMPS signal in the presence of relatively strong and arbitrary CCI. Although these advantages relate specifically to an AMPS signal using the model described above, the same principles can be applied to other desired signals, producing time-varying coefficients for a null filter for the desired signal in accordance with an appropriate model of the desired signal.

In addition to the alternatives which have been specifically mentioned above, it should be appreciated that numerous other changes, variations, and adaptations may be made to the particular arrangements described in detail above, within the scope of the claims.

What is claimed is:

1. A method of reducing co-channel interference with a desired signal in a predetermined frequency band in a received signal in a communications system, comprising the steps of:

sampling the received signal to produce samples x(k) each of which can be represented by a complex number;

limiting each sample in accordance with a function x(k)/|x(k)| to produce a limited signal sample of the received signal;

filtering the limited signal samples of the received signal to remove components not in said frequency band;

digitally processing the filtered limited signal samples to produce processed samples having components not in said frequency band; and filtering the processed samples to remove components not in said frequency band.

2. A method of reducing co-channel interference with a desired signal in a predetermined frequency band in a received signal in a communications system, comprising the steps of:

sampling the received signal to produce samples x(k) each of which can be represented by a complex number;

limiting each sample in accordance with a function x(k)/|x(k)| to produce a limited signal sample of the received signal;

filtering the limited signal samples of the received signal to remove components not in said frequency band;

forming a first product of each filtered limited signal sample multiplied by its complex conjugate;

filtering the first product to remove baseband d.c. components;

forming a second product of each filtered limited signal sample multiplied by the filtered first product;

forming a difference between each filtered limited signal sample and the second product; and filtering the difference to remove components not in said frequency band.

3. A method as claimed in claim 1 and further comprising the step of frequency converting the received signal to baseband prior to the sampling.

4. A method of reducing co-channel interference in complex signal samples x(k) of a baseband frequency modulated signal in a predetermined frequency band, comprising the steps of:

limiting each complex signal sample to form a limiter signal sample equal to x(k)/|x(k)|;

low pass filtering the limited signal samples to remove components not in the predetermined frequency band; and non-linearly filtering the filtered limited signal samples to further reduce co-channel interference.

5. A method of reducing co-channel interference in complex signal samples x(k) of a baseband frequency modulated signal in a predetermined frequency band, comprising the steps of:

limiting each complex signal sample to form a limited signal sample equal to x(k)/|x(k)|;

low pass filtering the limited signal samples to remove components not in the predetermined frequency band;

multiplying each filtered limited signal sample by its complex conjugate;

removing d.c. components from the product;

multiplying the result by the filtered limited signal sample; and low pass filtering a difference between the resulting product and the limited filtered signal sample to remove components not in the predetermined frequency band.

6. A method of reducing co-channel interference with a desired signal in a predetermined frequency band in a received signal in a communications system, comprising the steps of:

sampling the received signal to produce signal samples each of which can be represented by a complex number;

filtering the signal samples to form from each signal sample a plurality of filtered samples representing components of the signal sample in different narrow frequency bands within the predetermined frequency band;

identifying one of the plurality of filtered samples having a maximum momentary energy; and selecting at least the identified one of the plurality of filtered samples as a signal sample having reduced co-channel interference.

7. A method as claimed in claim 6 and further comprising the step of limiting each signal sample x(k) in accordance with a function x(k)/|x(k)| to produce a limited signal sample.

8. A method as claimed in claim 6 and further comprising the steps of limiting each signal sample x(k) in accordance with a function x(k)/|x(k)| to produce a limited signal sample, and low pass filtering the limited signal samples to remove components not in the predetermined frequency band.

9. A method as claimed in claim 7 wherein the step of filtering to form the plurality of filtered samples is subsequent to the step of limiting each sample.

10. A method as claimed in claim 8 wherein the step of filtering to form the plurality of filtered samples is subsequent to the step of limiting each sample.

11. A method of processing signal samples of a frequency modulated signal, comprising the steps of:

delaying signal samples by two sampling periods to produce three consecutive samples s(k−1), s(k), and s(k+1), and producing a demodulation signal by determining at least a real part of $$-j\frac{s(k+1)s*(k-1) - s(k)s*(k)}{s(k+1)s*(k-1) + s(k)s*(k)}$$

where s*(k−1) and s*(k) are the complex conjugates of s(k−1) and s(k) respectively.

12. A method as claimed in claim 11 and further comprising the step of limiting each signal sample x(k) in accordance with a function x(k)/|x(k)| to produce a limited signal sample.

13. A method as claimed in claim 11 and further comprising the steps of limiting each signal sample x(k) in accordance with a function x(k)/|x(k)| to produce a limited signal sample, and low pass filtering the limited signal samples to remove components not in a predetermined frequency band.

14. A method as claimed in claim 6 wherein there are at least three of the different narrow frequency bands having equally spaced center frequencies, the step of filtering each signal sample to form different ones of the plurality of filtered samples comprises the step of frequency converting the signal sample to a common center frequency for all of the different narrow frequency bands, and the step of selecting at least the identified one of the plurality of filtered samples as a signal sample having reduced co-channel interference comprises the step of frequency converting each selected filtered sample back to its original center frequency.

15. A method as claimed in claim 6 wherein the step of filtering to form each of the plurality of filtered samples comprises the step of filtering in accordance with an angular prolate spheroidal function.

16. A method of reducing co-channel interference in signal samples of a baseband frequency modulated signal in a predetermined frequency band, comprising the steps of:

filtering the signal samples to form from each signal sample a plurality of filtered samples representing components of the signal sample in at least three different narrow frequency bands having equally spaced center frequencies within the predetermined frequency band, the step of filtering to form different ones of the plurality of filtered samples comprising the step of frequency converting the signal sample to a common center frequency for all of the different narrow frequency bands;

identifying one of the plurality of filtered samples having a maximum momentary energy; and selecting at least the identified one of the plurality of filtered samples as a signal sample having reduced co-channel interference, the step of selecting comprising the step of frequency converting each selected filtered sample back to its original center frequency.

17. A method as claimed in claim 16 wherein the step of filtering to form each of the plurality of filtered samples comprises the step of filtering in accordance with an angular prolate spheroidal function.

18. Apparatus for reducing co-channel interference with complex signal samples of a desired signal in a predetermined frequency band in a received signal in a communications system, comprising:

a filter for filtering signal samples to form from each signal sample a plurality of filtered samples representing components of the signal sample in different narrow frequency bands within the predetermined frequency band;

a maximum energy selector for identifying one of the plurality of filtered samples having a maximum momentary energy; and a selector for selecting at least the identified one of the plurality of filtered samples as a signal sample having reduced co-channel interference.

19. A method as claimed in claim 12 wherein the step of producing the demodulation signal is subsequent to the step of limiting each sample.

20. Apparatus as claimed in claim 18 and further comprising a complex signal limiter for producing limited signal samples $x(k)/|x(k)|$ from the complex signal samples $x(k)$, and a low pass filter for filtering the limited samples.

21. A method as claimed in claim 13 wherein the step of producing the demodulation signal is subsequent to the step of limiting each sample.

22. A method as claimed in claim 7 and further comprising the steps of delaying signal samples by two sampling periods to produce three consecutive samples $s(k-1)$, $s(k)$, and $s(k+1)$, and producing a demodulation signal by determining at least a real part of $$-j\frac{s(k+1)s*(k-1) - s(k)s*(k)}{s(k+1)s*(k-1) + s(k)s*(k)}$$

where $s*(k-1)$ and $s*(k)$ are the complex conjugates of $s(k-1)$ and $s(k)$ respectively.

23. A method as claimed in claim 22 wherein the step of producing the demodulation signal is subsequent to the step of filtering the signal samples to produce the plurality of filtered samples.

24. A method as claimed in claim 6 and further comprising the steps of delaying signal samples by two sampling periods to produce three consecutive samples $s(k-1)$, $s(k)$, and $s(k+1)$, and producing a demodulation signal by determining at least a real part of $$-j\frac{s(k+1)s*(k-1) - s(k)s*(k)}{s(k+1)s*(k-1) + s(k)s*(k)}$$

where $s*(k-1)$ and $s*(k)$ are the complex conjugates of $s(k-1)$ and $s(k)$ respectively.

25. A method as claimed in claim 24 wherein the step of producing the demodulation signal is subsequent to the step of filtering the signal samples to produce the plurality of filtered samples.

26. A method as claimed in claim 16 and further comprising the steps of delaying signal samples by two sampling periods to produce three consecutive samples $s(k-1)$, $s(k)$, and $s(k+1)$, and producing a demodulation signal by determining at least a real part of $$-j\frac{s(k+1)s*(k-1) - s(k)s*(k)}{s(k+1)s*(k-1) + s(k)s*(k)}$$

where $s*(k-1)$ and $s*(k)$ are the complex conjugates of $s(k-1)$ and $s(k)$ respectively.

27. A method as claimed in claim 26 wherein the step of producing the demodulation signal is subsequent to the step of filtering the signal samples to produce the plurality of filtered samples.

28. A method as claimed in claim 11 and further comprising the step of determining the arctangent of the demodulation signal to produce a demodulated signal.

29. A method as claimed in claim 12 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

30. A method as claimed in claim 13 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

31. A method as claimed in claim 22 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

32. A method as claimed in claim 24 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

33. A method as claimed in claim 26 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

34. A method as claimed in claim 11 and further comprising the steps of:

filtering signal samples in a time-varying null filter for the desired signal to produce error signal samples;

determining time-varying coefficients for the null filter in dependence upon the demodulation signal; and subtracting the error signal samples from the signal samples to produce output signal samples.

35. A digital signal processor programmed and arranged for carrying out the method of claim 4.

36. Apparatus for reducing co-channel interference in complex signal samples of a baseband frequency modulated signal in a predetermined frequency band, comprising:

a complex signal limiter and non-linear filter for producing non-linear filtered, limited samples from the signal samples;

a selective filter supplied with the non-linear filtered, limited samples for producing maximum momentary energy signal samples from different parts of the frequency band at different times;

a non-linear transform unit for producing a demodulation signal from the maximum momentary energy signal samples produced by the selective filter; and a null filter unit responsive to the demodulation signal to provide time-varying null filter coefficients for separating a desired signal from co-channel interference in the non-linear filtered, limited signal samples.

37. Apparatus for reducing co-channel interference in complex signal samples x(k) of a baseband frequency modulated signal in a predetermined frequency band, comprising:

a complex signal limiter for producing limited signal samples x(k)/|x(k)| from the complex signal samples x(k);

a low pass filter for filtering the limited samples; and a non-linear filter for non-linearly filtering samples output from the low pass filter to produce non-linear samples having further reduced co-channel interference.

38. Apparatus as claimed in claim 37 wherein the non-linear filter comprises a first multiplier for producing a first product of each filtered limited signal sample output from the low pass filter and its complex conjugate; a high pass filter for removing d.c. components from the first product; a second multiplier for producing a second product of each filtered limited signal sample and the high pass filtered first product; a circuit for producing a difference between each filtered limited signal sample and the second product; and a low pass filter for filtering said difference.

39. Apparatus as claimed in claim 20 wherein the selective filter is supplied with the limited samples.

40. Apparatus as claimed in claim 18 wherein the selective filter comprises a converter for frequency converting the signal samples to a common center frequency for all of the different narrow frequency bands, and a converter for frequency converting each filtered sample selected by the selector back to its original center frequency.

41. Apparatus as claimed in claim 18 wherein each filter comprises an angular prolate spheroidal function filter.

42. Apparatus as claimed in claim 20 wherein the selective filter comprises a converter for frequency converting the signal samples to a common center frequency for all of the different narrow frequency bands, and a converter for frequency converting each filtered sample selected by the selector back to its original center frequency.

43. Apparatus as claimed in claim 20 wherein each filter comprises an angular prolate spheroidal function filter.

44. Apparatus as claimed in claim 18 and further including a demodulator comprising delay elements for delaying signal samples by two sampling periods to produce three consecutive samples s(k−1), s(k), and s(k+1), and elements for producing a demodulation signal by determining at least a real part of $$-j\frac{s(k+1)s*(k-1) - s(k)s*(k)}{s(k+1)s*(k-1) + s(k)s*(k)}$$

where s*(k−1) and s*(k) are the complex conjugates of s(k−1) and s(k) respectively.

45. Apparatus as claimed in claim 44 and further comprising:

a time-varying filter for filtering signal samples in dependence upon time-varying coefficients to produce error signal samples;

a unit for determining the time-varying coefficients for the null filter in dependence upon the demodulation signal; and a unit for subtracting the error signal samples from the signal samples to produce output signal samples.

46. Apparatus for processing signal samples of a frequency modulated signal, the apparatus including a demodulator comprising delay elements for delaying signal samples by two sampling periods to produce three consecutive samples s(k−1), and s(k), and s(k+1), and elements for producing a demodulation signal by determining at least a real part of $$-j\frac{s(k+1)s*(k-1) - s(k)s*(k)}{s(k+1)s*(k-1) + s(k)s*(k)}$$

where s*(k−1) and s*(k) are the complex conjugates of s(k−1) and s(k) respectively, and further comprising a complex signal limiter for producing limited signal samples x(k)/|x(k)| from complex signal samples x(k), and a low pass for filtering the limited samples to produce the signal samples for the demodulator.

47. Apparatus as claimed in claim 46 and further comprising:

a time-varying filter for filtering signal samples in dependence upon time-varying coefficients to produce error signal samples;

a unit for determining the time-varying coefficients for the time varying filter in dependence upon the demodulation signal; and unit for subtracting the error signal samples from the signal samples to produce output signal samples.

* * * * *

UNITED STATES PATENT AND TRADEMARK OFFICE
CERTIFICATE OF CORRECTION

PATENT NO. : 5,995,565
DATED : November 30, 1999
INVENTOR(S) : Wen TONG.

It is certified that error appears in the above-identified patent and that said Letters Patent is hereby corrected as shown below:

On the title page:

Item [30]     ASSIGNEE was omitted. Please insert the following:

--NORTEL NETWORKS CORPORATION- -.

Signed and Sealed this

Twenty-second Day of May, 2001

*Attest:*

NICHOLAS P. GODICI

*Attesting Officer*     Acting Director of the United States Patent and Trademark Office